US008658312B2

(12) United States Patent
Honoki et al.

(10) Patent No.: US 8,658,312 B2
(45) Date of Patent: Feb. 25, 2014

(54) POSITIVE ELECTRODE FOR LITHIUM ION BATTERY, FABRICATION METHOD THEREOF, AND LITHIUM ION BATTERY USING THE SAME

(75) Inventors: Kenichi Honoki, Osaka (JP); Kensuke Nakura, Osaka (JP)

(73) Assignee: Panasonic Corporation, Osaka (JP)

( * ) Notice: Subject to any disclaimer, the term of this patent is extended or adjusted under 35 U.S.C. 154(b) by 165 days.

(21) Appl. No.: 13/377,112

(22) PCT Filed: Dec. 9, 2010

(86) PCT No.: PCT/JP2010/007176
§ 371 (c)(1),
(2), (4) Date: Dec. 8, 2011

(87) PCT Pub. No.: WO2011/121691
PCT Pub. Date: Oct. 6, 2011

(65) Prior Publication Data
US 2012/0094177 A1    Apr. 19, 2012

(30) Foreign Application Priority Data
Mar. 31, 2010    (JP) .................................. 2010-082900

(51) Int. Cl.
*H01M 4/131* (2010.01)
*H01M 4/1391* (2010.01)
*H01M 4/525* (2010.01)
*H01M 4/62* (2006.01)

(52) U.S. Cl.
USPC ..... 429/211; 429/223; 429/231.1; 429/231.3; 29/623.5; 252/182.1

(58) Field of Classification Search
USPC ......... 429/211, 231.1, 231.3, 223; 427/126.4; 252/182.1
See application file for complete search history.

(56) References Cited

U.S. PATENT DOCUMENTS 5,427,875 A    6/1995    Yamamoto et al.

FOREIGN PATENT DOCUMENTS

| JP | 4-329268    | 11/1992 |
| JP | 05-182667   | 7/1993  |
| JP | 07-245105   | 9/1995  |
| JP | 2006-127955 | 5/2006  |
| JP | 2007-227310 | 9/2007  |
| JP | 2008-181830 | 8/2008  |
| JP | 2009-245954 | 10/2009 |

OTHER PUBLICATIONS

IPDL Machine Translation of the Detailed Description of JP 2007-227310A (Sep. 2007).*
International Search Report issued in International Patent Application No. PCT/JP2010/007176, mailed Feb. 1, 2011.

* cited by examiner

*Primary Examiner* — Gregg Cantelmo
(74) *Attorney, Agent, or Firm* — McDermott Will & Emery LLP (57) ABSTRACT

A positive electrode includes a positive electrode current collector, and a positive electrode active material layer formed on the surface of the positive electrode current collector. The positive electrode active material layer includes: a lithium-containing nickel oxide represented by the general formula (1): $Li_xNi_{1-(p+q+r)}Co_pAl_qM_rO_{2+y}$, where M is a transition metal (excluding Ni and Co) or the like, $0.8 \le x \le 1.4$, and $0 < (p+q+r) \le 0.7$); and lithium carbonate. The positive electrode active material layer has a high concentration region of the lithium carbonate and a low concentration region of the lithium carbonate. The high concentration region covers 2 to 80% of the total thickness of the positive electrode active material layer, the range starting from the surface thereof. The low concentration region covers the range remaining on the positive electrode current collector side of the positive electrode active material layer.

6 Claims, 2 Drawing Sheets

POSITIVE ELECTRODE FOR LITHIUM ION BATTERY, FABRICATION METHOD THEREOF, AND LITHIUM ION BATTERY USING THE SAME

RELATED APPLICATIONS

This application is the U.S. National Phase under 35 U.S.C. §371 of International Application No. PCT/JP2010/007176, filed on Dec. 9, 2010, which in turn claims the benefit of Japanese Application No. 2010-082900, filed on Mar. 31, 2010, the disclosures of which Applications are incorporated by reference herein.

TECHNICAL FIELD

The present invention relates to a lithium ion battery, and specifically relates to improving a positive electrode for a lithium ion battery.

BACKGROUND ART

A lithium ion battery comprises a positive electrode, a negative electrode, a separator disposed therebetween, and a non-aqueous electrolyte. Widely known as the positive electrode active material included in the positive electrode, is a lithium-containing cobalt oxide such as LiwCoO2 (where w is a variable that changes according to charge and discharge of the battery (hereinafter, the same meaning shall apply)). A lithium-containing cobalt oxide has a high potential relative to lithium, is excellent in reliability, and is relatively easy to synthesize.

Meanwhile, a lithium-containing nickel oxide such as $Li_wNiO_2$ has recently been considered for use and thus been put into use as a positive electrode active material. Lithium ion batteries using a lithium-containing nickel oxide is anticipated for use as the respective power sources for electric vehicles, hybrid cars, power tools, energy storage, etc. Thus, the following proposals have been made to obtain batteries being excellent in durability, reliability, and input/output characteristics.

PTL 1 discloses a lithium-containing nickel oxide containing different elements such as Co, Al, and Mn. According to PTL 1, such a lithium-containing nickel oxide has poor reactivity with a non-aqueous electrolyte, and its use as a positive electrode active material enables reduction in internal resistance of a lithium ion battery.

PTL 2 discloses a lithium ion battery having a positive electrode which includes: lithium nickel cobalt manganese oxide; and lithium carbonate having an average particle size of 5 to 30 μm. According to PTL 2, by mixing lithium carbonate having an average particle size of 5 to 30 μm, together with lithium nickel cobalt manganese oxide, both materials can be mixed evenly, resulting in improved reliability at times of overcharge.

[Citation List]
[Patent Literatures]

[PTL 1] Japanese Laid-Open Patent Publication No. 2006-127955

[PTL 2] Japanese Laid-Open Patent Publication No. 2008-181830

SUMMARY OF INVENTION

Technical Problem

However, when a lithium-containing nickel oxide reacts with moisture in the atmosphere, lithium hydroxide is produced, and further, when the lithium hydroxide thus produced reacts with carbon dioxide in the atmosphere, lithium carbonate is produced. In the alternative, when a lithium-containing nickel oxide directly reacts with carbon dioxide in the atmosphere, lithium carbonate is produced. Thus, lithium carbonate is likely to attach to the surface of a lithium-containing nickel oxide. Such attachment of lithium carbonate likewise occurs to the surface of the lithium-containing nickel oxide described in PTL 1. With respect to a lithium ion battery in which a positive electrode includes a lithium-containing nickel oxide having lithium carbonate attached to the surface thereof, there is a possibility of gas generating therein due to decomposition of the lithium carbonate, not only when the battery is in an overcharged state, but also when it is stored under high temperatures. Such gas generation likewise occurs in the lithium ion battery disclosed in PTL 2, and is preferably suppressed in terms of improving durability and reliability of lithium ion batteries.

To suppress gas generation due to decomposition of the lithium carbonate, for example, the lithium-containing nickel oxide may be washed to remove the lithium carbonate attached to the surface thereof. However, though the reason remains unclear, a lithium ion battery using a washed lithium-containing nickel oxide as a positive electrode active material exhibits lower input/output characteristics compared to using a lithium-containing nickel oxide having a large amount of lithium carbonate attached.

The present invention aims to solve the above problem, so as to provide: a positive electrode including a lithium-containing nickel oxide as a positive electrode active material and having excellent input/output characteristics, durability, and reliability; and a lithium ion battery using the above positive electrode.

Solution to Problem

One aspect of the present invention relates to a positive electrode for a lithium ion battery, comprising a positive electrode current collector, and a positive electrode active material layer formed on a surface of the positive electrode current collector. The positive electrode active material layer comprises: a lithium-containing nickel oxide represented by the general formula (1): $Li_xNi_{1-(p+q+r)}Co_pAl_qM_rO_{2+y}$, where M is one element selected from the group consisting of transition elements (excluding Ni and Co), Mg, Ca, Zn, and Bi, $0.8 \leq x \leq 1.4$, $-0.1 \leq y \leq 0.1$, and $0 < (p+q+r) \leq 0.7$; and lithium carbonate. The positive electrode active material layer comprises a high concentration region where the lithium carbonate concentration is high, and a low concentration region where the lithium carbonate concentration is low. The high concentration region covers a range of 2 to 80% of the total thickness of the positive electrode active material layer, the range starting from the surface thereof, and the low concentration region covers the range remaining on the positive electrode current collector side of the positive electrode active material layer.

The input/output characteristics of the lithium ion battery improves, when, as above, the lithium carbonate concentration on the surface side of the positive electrode active material layer is higher than that on the positive electrode current collector side thereof. Polarization of positive and negative electrodes during charge and discharge of a battery mainly occurs at the part of the electrode surface, and according to the above positive electrode, occurrence of polarization at the positive electrode surface can be suppressed due to the high concentration of the lithium carbonate on the surface side of the positive electrode active material layer. Moreover, in the above positive electrode, since a difference is created between the respective lithium carbonate concentrations on the surface side and on the positive electrode current collector side of the positive electrode active material layer, it is possible to reduce the lithium carbonate concentration in the entire positive electrode active material layer, while increasing the lithium carbonate concentration on the surface side of the positive electrode active material layer. Thus, in the lithium ion battery using the above positive electrode, gas generation due to decomposition of the lithium carbonate can be suppressed compared to when the lithium carbonate concentration is high in the entire positive electrode active material layer, thereby improving durability and reliability of the battery.

Another aspect of the present invention relates to a fabrication method of a positive electrode for a lithium ion battery, the method comprising the steps of: applying to a surface of a positive electrode current collector, a positive electrode material mixture for inner layer formation, the mixture comprising a lithium-containing nickel oxide represented by the general formula (1) and lithium carbonate, thereby forming an inner layer; and applying to a surface of the inner layer, a positive electrode material mixture for outer layer formation, the mixture comprising a lithium-containing nickel oxide represented by the general formula (1) and lithium carbonate, thereby forming an outer layer. A lithium content $x_2$ in the lithium-containing nickel oxide in the positive electrode material mixture for outer layer formation, is greater than a lithium content $x_1$ in the lithium-containing nickel oxide in the positive electrode material mixture for inner layer formation.

As described earlier, when the lithium in the positive electrode active material reacts with moisture in the atmosphere, lithium hydroxide is produced, and when the lithium hydroxide further reacts with carbon dioxide in the atmosphere, lithium carbonate is produced. In the alternative, when the lithium directly reacts with carbon dioxide in the atmosphere, lithium carbonate is produced. Therefore, in the positive electrode fabricated by the above fabrication method, the lithium content x in the lithium-containing nickel oxide is higher in the outer layer on the surface side of the positive electrode active material layer than in the inner layer on the positive electrode current collector side thereof, and thus, the lithium carbonate concentration is also higher in the outer layer on the surface side of the positive electrode active material layer than in the inner layer on the positive electrode current collector side thereof. As a result, the lithium carbonate concentration can be changed discontinuously, in the thickness direction of the positive electrode active material layer.

A further aspect of the present invention relates to a fabrication method of a positive electrode for a lithium ion battery, the method comprising the steps of: applying to a surface of a positive electrode current collector, a positive electrode material mixture comprising a lithium-containing nickel oxide represented by the general formula (1) and lithium carbonate, thereby forming a positive electrode active material layer; and exposing the positive electrode active material layer to a gas flow containing at least one of moist air and carbon dioxide gas.

According to the above fabrication method, lithium hydroxide is produced from Li in the lithium-containing nickel oxide due to water vapor that permeates from the surface to the inner part of the positive electrode active material layer, and the lithium hydroxide thus produced further reacting with carbon dioxide in the atmosphere causes production of lithium carbonate. In the alternative, lithium carbonate is produced directly from the lithium-containing nickel oxide, due to carbon dioxide gas that permeates from the surface to the inner part of the positive electrode active material layer. Thus, the lithium carbonate concentration can be changed continuously in the thickness direction of the positive electrode active material layer. Further, the high concentration region where the lithium carbonate concentration is high can be designated on the surface side of the positive electrode active material layer, and the low concentration region where the lithium carbonate concentration is low can be designated on the positive electrode current collector side thereof.

Yet another aspect of the present invention relates to a lithium ion battery comprising the positive electrode described earlier, a negative electrode, a separator separating the positive electrode and the negative electrode, and a non-aqueous electrolyte.

Advantageous Effects of Invention

According to the present invention, excellent input/output characteristics, durability, and reliability can be realized in a lithium ion battery including a lithium-containing nickel oxide as a positive electrode active material.

DESCRIPTION OF EMBODIMENTS

The object, features, aspects, and advantages of the present invention will become more apparent by referring to the following detailed description and accompanying drawings.

First, a description will be given on a preferred embodiment of a positive electrode for a lithium ion battery according to the present invention.

Figure 1:
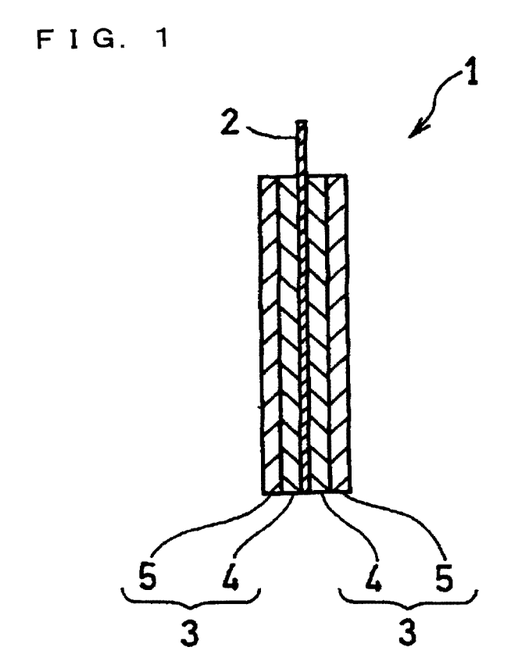
[FIG. 1] A horizontal sectional view schematically showing an example of a positive electrode in one embodiment.

A positive electrode 1 for a lithium ion battery, shown in FIG. 1, comprises a positive electrode current collector 2, and a positive electrode active material layer 3 formed on the surface of the positive electrode current collector 2. The positive electrode active material layer 3 comprises an inner layer 4 formed on the surface of the positive electrode current collector 2, and an outer layer 5 formed on the surface of the inner layer 4. The inner layer 4 and the outer layer 5 both contain: a lithium-containing nickel oxide serving as a positive electrode active material and represented by the general formula (1): $Li_xNi_{1-(p+q+r)}Co_pAl_qM_rO_{2+y}$, where M is at least one element selected from the group consisting of transition elements (excluding Ni and Co), Mg, Ca, Zn, and Bi, $0.8 \leq x \leq 1.4$, $-0.1 \leq y \leq 0.1$, and $0 \leq (p+q+r) \leq 0.7$; and lithium carbonate. Further, the lithium carbonate concentration in the outer layer 5 is higher than that in the inner layer 4.

As shown in FIG. 1, the positive electrode active material layer 3, in which the lithium carbonate concentration changes discontinuously in the thickness direction of the layer, can be formed, for example, by the following steps. First, the lithium-containing nickel oxide represented by the general formula (1) and a binder are dispersed in a dispersion medium, thereby preparing a positive electrode material mixture for inner layer 4 formation in slurry or paste form. The positive electrode material mixture thus obtained is applied to the surface of the positive electrode current collector, followed by drying, thereby forming the inner layer 4. Next, a positive electrode material mixture for outer layer formation is prepared in the same manner as above, except for using the lithium-containing nickel oxide with the lithium content x being greater than that of the lithium-containing nickel oxide used in the positive electrode material mixture for inner layer formation. The positive electrode material mixture for outer layer formation thus obtained is applied to the surface of the inner layer 4, followed by drying, thereby forming the outer layer 5.

Figure 2:
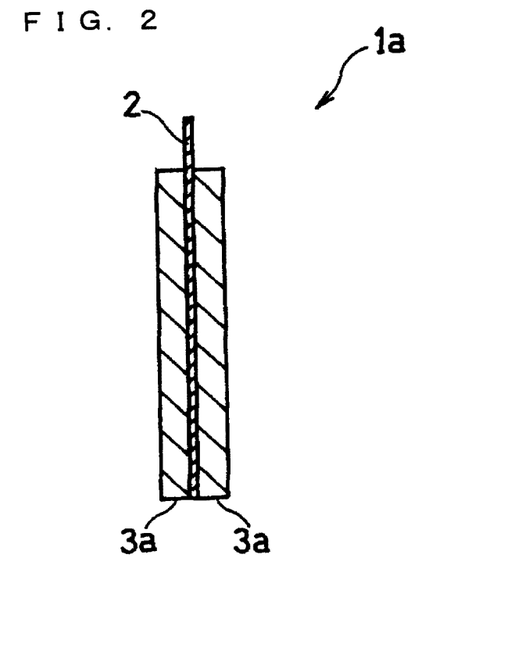
[FIG. 2] A horizontal sectional view schematically showing another example of a positive electrode in another embodiment.

A positive electrode 1a for a lithium ion battery, shown in FIG. 2, comprises a positive electrode current collector 2, and a positive electrode active material layer 3a formed on the surface of the positive electrode current collector 2. The positive electrode active material layer 3a contains a lithium-containing nickel oxide serving as a positive electrode active material and represented by the general formula (1), and lithium carbonate. Further, the positive electrode active material layer 3a has therein, a concentration gradient of the lithium carbonate. The lithium carbonate concentration in the positive electrode active material layer 3a is high on the surface side of the layer, and low on the positive electrode current collector 2 side thereof.

As shown in FIG. 2, the positive electrode active material layer 3a, in which the lithium carbonate concentration changes continuously in the thickness direction of the layer, can be formed, for example, by the following steps. First, the lithium-containing nickel oxide represented by the general formula (1) and a binder are dispersed in a dispersion medium, thereby preparing a positive electrode material mixture in slurry or paste form. The positive electrode material mixture thus obtained is applied to the surface of the positive electrode current collector, followed by drying, thereby forming a positive electrode active material layer.

Next, to create a concentration gradient of the lithium carbonate in the positive electrode active material layer thus formed, the positive electrode active material layer is exposed to a gas flow containing at least one of moist air and carbon dioxide gas. This enables a continuous concentration gradient to be created for the lithium carbonate concentration in the positive electrode active material layer 3a. The lithium carbonate concentration in the positive electrode active material layer 3a is high on the surface side and gradually becomes low toward the positive electrode current collector 2 side.

The lithium-containing nickel oxide represented by the general formula (1) and used in the present embodiment usually has the lithium carbonate attached to the surface thereof. Therefore, the lithium carbonate is contained in the positive electrode material mixture, and is thus contained in the inner layer 4, the outer layer 5, and the positive electrode active material layer 3a, each to which this positive electrode material mixture is applied. The lithium carbonate may also be separately added to the positive electrode material mixture, in accordance with the amount of the lithium carbonate attached to the lithium-containing nickel oxide in advance.

Note that an additive such as a conductive agent can be contained in the positive electrode material mixture.

Specific examples of the positive electrode current collector 2 include, but are not particularly limited to, current collectors used for a positive electrode in a lithium ion battery. Specifically, a material such as aluminum or an aluminum alloy can be used in the form such as of a foil, membrane, film, or sheet. The thickness of the positive electrode current collector 2 can be set as appropriate within the range of 1 to 500 µm, in accordance with factors such as capacity and size of the lithium ion battery.

With respect to the lithium-containing nickel oxides in the positive electrode active material layers 3 and 3a each represented by the general formula (1), x indicates the Li content. The value for this x varies according to charge and discharge of the battery.

In the case of forming the positive electrode active material layer 3 in the positive electrode 1 shown in FIG. 1, the Li content $x_1$ in the lithium-containing nickel oxide ($Li_x Ni_{1-(p+q+r)} Co_p Al_q M_r O_{2+y}$) contained in the positive electrode material mixture for inner layer 4 formation, and the Li content $x_2$ in the lithium-containing nickel oxide for outer layer 5 formation, are each set to be $x_2 > x_1$ during the state before charge and discharge are performed on the lithium ion battery.

The Li content $x_1$ in the positive electrode material mixture for inner layer 4 formation is preferably 0.8 to 1.1, and more preferably 0.9 to 1.0. If $x_1$ is lower than 0.8, the lithium content in the lithium-containing nickel oxide would tend to be deficient, thus possibly causing decrease in the capacity of the lithium ion battery. Meanwhile, the Li content $x_2$ in the positive electrode material mixture for outer layer 5 formation is preferably 1.0 to 1.4, more preferably 1.0 to 1.2, and particularly preferably 1.0 to 1.1. If $x_2$ is higher than 1.4, the amount of the lithium carbonate attached to the surface of the lithium-containing nickel oxide would tend to be excessive. In such an instance, there is a possibility of deterioration in the input/output characteristics of the lithium ion battery, since the lithium carbonate inhibits intercalation and deintercalation of lithium ions.

The positive electrode active material layer 3, formed by the application and drying of the respective positive electrode material mixtures for inner layer formation and for outer layer formation, is usually rolled by being pressed a number of times with rollers or the like. The filling density of the positive electrode active material in the positive electrode active material layer 3 after the rolling is preferably 2 to 3.9 g/cm³.

The thickness of the outer layer 5 is preferably 2 to 80% and more preferably 5 to 50%, relative to the thickness of the entire positive electrode active material layer 3. If the proportion of the thickness of the outer layer 5 is lower than 2% of the entire thickness, the effect of improved input/output characteristics may not be easily achieved. In contrast, if the proportion of the thickness of the outer layer 5 is higher than 80% of the entire thickness, the thickness of the inner layer 4 would tend to be too thin, and the effect of suppressing the amount of gas generated during high-temperature storage may not be easily achieved.

In the case of forming the positive electrode active material layer 3a in the positive electrode 1a shown in FIG. 2, the range for the Li content x in the lithium-containing nickel oxide contained in the positive electrode material mixture is preferably 0.8≤x≤1.4 and more preferably 0.9≤x≤1.1 during the state before charge and discharge are performed on the lithium ion battery. If x is lower than 0.8, the lithium content in the lithium-containing nickel oxide would tend to be deficient, thus possibly causing decrease in the capacity of the lithium ion battery. Meanwhile, if x is higher than 1.4, the amount of the lithium carbonate attached to the surface of the lithium-containing nickel oxide would tend to be excessive. In such an instance, there is a possibility of deterioration in input/output characteristics of the lithium ion battery, since the lithium carbonate inhibits intercalation and deintercalation of lithium ions.

In the case of forming the positive electrode active material layer 3a shown in FIG. 2 by exposing the positive electrode active material to a gas flow containing moist air, the relative humidity of the moist air is preferably 1 to 70% RH and more preferably 5 to 50% RH. If the relative humidity of the moist air is lower than 1% RH, there is a possibility of insufficiency in the effect of creating a concentration gradient of the lithium carbonate in the positive electrode active material layer 3a. If the relative humidity of the moist air is higher than 70% RH, moisture would tend to attach excessively to the positive electrode active material layer 3a. In such an instance, there is a possibility of an excessive amount of the lithium carbonate attaching to the positive electrode active material.

The temperature of the moist air is preferably 5 to 300° C. and more preferably 20 to 110° C. If the temperature of the moist air is lower than 5° C., there is a possibility of insufficiency in the effect of creating a concentration gradient of the lithium carbonate in the positive electrode active material layer 3a. If the temperature of the moist air is higher than 300° C., there is a possibility of an excessive amount of the lithium carbonate attaching to the positive electrode active material.

In the case of forming the positive electrode active material layer 3a shown in FIG. 2 by exposing the positive electrode active material to a gas flow containing carbon dioxide gas, the concentration of carbon dioxide in the gas flow containing carbon dioxide gas is preferably 0.01 vol % or higher and more preferably 0.03 vol % or higher. If the concentration of the carbon dioxide is lower than 0.01 vol %, there is a possibility of insufficiency in the effect of creating a concentration gradient of the lithium carbonate in the positive electrode active material layer 3a.

The temperature of the gas flow containing carbon dioxide gas is preferably 5 to 300° C. and more preferably 20 to 110° C. If the temperature of the gas flow containing carbon dioxide gas is lower than 5° C., there is a possibility of insufficiency in the effect of creating a concentration gradient in the lithium carbonate in the positive electrode active material layer 3a. If the gas flow containing carbon dioxide gas is higher than 300° C., there is a possibility of an excessive amount of the lithium carbonate attaching to the positive electrode active material.

With respect to the lithium-containing nickel oxide represented by the general formula (1) and used in the present embodiment, p, q, and r indicate the contents of Co, Al, and an element M, respectively. The sum of p, q, and r (p+q+r) indicates the amount of Co, Al, and the element M as different elements substituting for the Ni in the lithium-containing nickel oxide. The range for (p+q+r) is preferably $0<(p+q+r)\leq0.7$ and more preferably $0.1\leq(p+q+r)\leq0.4$. When (p+q+r) is too small, that is, when the amount of Co, Al, and the element M substituting for the Ni in the lithium-containing nickel oxide is too small, cycle life and thermal stability related to the positive electrode active material tend to deteriorate. In contrast, when (p+q+r) is too large, that is when the amount of substitution by Co, Al, and element M is too large, the capacity of the positive electrode active material tends to become reduced.

The range for the p indicating the Co content is preferably $0\leq p\leq0.7$, more preferably $0<p<0.7$, and particularly preferably $0.1\leq p\leq0.3$. The range for the q indicating the Al content is preferably $0\leq q\leq0.3$, more preferably $0<q<0.3$, and particularly preferably $0.01\leq q\leq0.2$. The range for the r indicating the element M content is preferably $0\leq r\leq0.4$. Note that the range for 1−(p+q+r) indicating the Ni content is $0.3\leq[1-(p+q+r)]<1$ and preferably $0.6\leq[1-(p+q+r)]\leq0.9$.

An example of the element M is at least one element selected from the group consisting of transition elements (excluding Ni and Co), Mg, Ca, Zn, and Bi. Examples of transition elements, excluding Ni and Co, include Sc, Ti, V, Cr, Mn, Fe, Cu, Y, and Zr. The element M is an arbitrary constituent with no particular limitation, and the lithium-containing nickel oxide containing element(s) from the above group enables: promotion of sintering during synthesis of the lithium-containing nickel oxide by baking; and improvement in cycle characteristics and reliability of the lithium ion battery.

The lithium-containing nickel oxide represented by the general formula (1) may have the element M excluded. In such an instance, the lithium-containing nickel oxide is represented by the general formula: $Li_xNi_{1-(p+q)}Co_pAl_qO_{2+y}$ (where $0.8\leq x\leq1.4$, $-0.1\leq y\leq0.1$, and $0<(p+q)\leq0.7$).

With respect to the lithium-containing nickel oxide represented by the general formula (1), y indicates the amount of excess oxygen or the amount of oxygen deficiency, and its range is preferably −0.1 to 0.1. If the y is outside the above range, the crystal structure would tend to deform due to the amount of excess oxygen or of oxygen deficiency becoming superfluous, thus possibly causing reversibility in charge and discharge to deteriorate.

The lithium-containing nickel oxide represented by the general formula (1) may undergo fluorination. The fluorination is preferably to the extent that a fluorine content z is $0\leq z\leq0.1$, when the sum of the Ni, Co, Al, and the element M contents in the lithium-containing nickel oxide is 1. By setting the F content z within the above range, high-temperature storage characteristics of the lithium ion battery can be improved. Meanwhile, when z is higher than 0.1, the crystal structure tends to deform due to the F content becoming superfluous. In such an instance, there is a possibility of reversibility in charge and discharge deteriorating.

Examples of the binder contained in the positive electrode material mixture include, but are not particularly limited to, binders used for a positive electrode in a lithium ion battery. Specifically, examples thereof include: fluorine-containing polymers such as polytetrafluoroethylene, polyvinylidene fluoride (PVDF), a modified PVDF, a tetrafluoroethylene-hexafluoropropylene copolymer, and a vinylidene fluoride-tetrafluoroethylene copolymer; rubbers such as styrene-butadiene rubber; and polyolefin resins such as polyethylene and polypropylene. These can be used singly or in a combination of two or more.

Examples of the conductive agent include: graphites; carbon blacks such as acetylene black, ketjen black, furnace black, lamp black, and thermal black; and carbon fibers and metal fibers.

The proportion of the positive electrode active material content is preferably 80 to 98 mass % and more preferably 85 to 96 mass %, relative to the total mass of the positive electrode active material layer. The proportion of the binder content is preferably 10 mass % or less and more preferably 1 to 10 mass %, relative to the total mass of the positive electrode active material layer. The proportion of the conductive agent content is preferably 20 mass % or less and more preferably 1 to 20 mass %, relative to the total mass of the positive electrode active material layer.

In terms of reducing the amount of gas generated due to decomposition of the lithium carbonate during high-temperature storage, the concentration of the lithium carbonate contained in the positive electrode active material layer on the positive electrode current collector side is preferably 0.5 to 90%, more preferably 1 to 80%, and particularly preferably 1 to 50%, relative to the concentration of the lithium carbonate contained therein on the surface side.

Note that, though the reason remains unclear, input/output characteristics are better with use of a lithium-containing nickel oxide with a high lithium carbonate concentration, than a lithium-containing nickel oxide with a low lithium carbonate concentration. However, during high-temperature storage, gas is generated due to decomposition of the lithium carbonate, thus possibly causing decline in durability and reliability of the battery. Meanwhile, generation of gas can be suppressed, by setting the lithium carbonate concentration on the positive electrode current collector 2 side of the positive electrode active material layer, to be within the range of 0.5 to 90% relative to the lithium carbonate concentration on the surface side thereof.

The lithium carbonate concentration can be measured by X-ray photoelectron spectroscopy (XPS), and is expressed by, for example, a ratio (C1s/Ni2p) of the intensity of the C1s spectrum of the lithium carbonate, to the intensity of the Ni2p spectrum of the lithium-containing nickel oxide. When the lithium carbonate concentration on the surface side of the positive electrode active material layer is higher than that on the positive electrode current collector side thereof, the ratio (C1s/Ni2p) of the spectral intensities on the surface side of the positive electrode active material layer is observed to be higher than that on the positive electrode current collector side thereof.

Next, a description will be given on a preferred embodiment of a lithium ion battery according to the present invention.

The lithium ion battery according to the present invention comprises the positive electrode for a lithium ion battery, described earlier. Components other than the positive electrode are not particularly limited.

Figure 3:
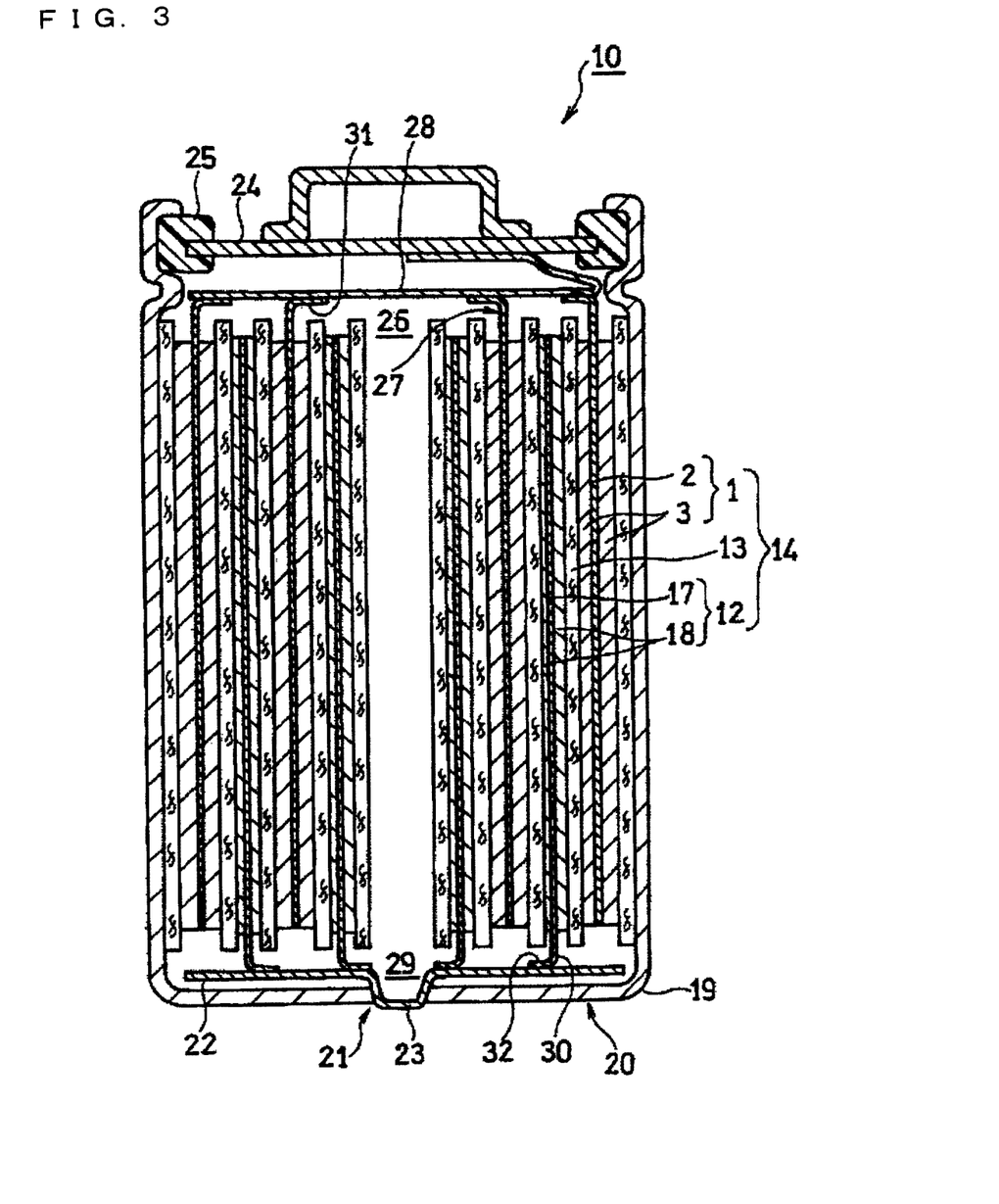
[FIG. 3] A vertical sectional view of a cylindrical lithium ion battery in one embodiment.

A lithium ion battery 10 shown in FIG. 3 comprises: the above positive electrode 1 for a lithium ion battery; a negative electrode 12 capable of absorbing and releasing lithium; and a separator 13 interposed therebetween, which are spirally wound to form an electrode assembly 14. The negative electrode 12 comprises: a negative electrode current collector 17; and negative electrode active material layers 18 formed respectively on both surfaces of the negative electrode current collector 17.

The electrode assembly 14 is housed in a battery case 19, together with a non-aqueous electrolyte (not shown). Note that a separator is also disposed between the electrode assembly 14 and the inner circumference of the battery case 19. The battery case 19 is a substantially cylindrical component, of which one end is closed with a bottom 20 and the other end is open. The bottom 20 has, at the center portion thereof, a through-hole 21 for fitting in a negative electrode terminal. The through-hole 21 is blocked with a protrusion 23 of a negative electrode current-collecting terminal plate 22. The edge of the through-hole 21 and the surface of the protrusion 23 are welded to each other by seam welding or the like. The protrusion 23 of the negative electrode current-collecting terminal plate 22 also serves as a negative electrode terminal. The other end of the battery case 19 is sealed with a sealing plate 24, and an insulating gasket 25 attached to the peripheral edge of the sealing plate 24.

The positive electrode current collector 2 has, on the side of one end 26 of the electrode assembly 14 in the winding axis direction, an exposed portion 27 on which the positive electrode active material layer 3 is not formed. The exposed portion 27 is electrically connected to the sealing plate 24 also serving as a positive electrode terminal, via a positive electrode current-collecting terminal plate 28 disposed on the side of the one end 26 of the electrode assembly 14, in the battery case 19. Meanwhile, the negative electrode current collector 17 has, on the other end 29 of the electrode assembly 14 in the winding axis direction, an exposed portion 30 on which the negative electrode active material layer 18 is not formed. The exposed portion 30 is electrically connected to the negative electrode current-collecting terminal plate 22 disposed on the side of the other end 29 of the electrode assembly 14, in the battery case 19. The tip of the exposed portion 27 of the positive electrode current collector 2 is a flat portion 31 plastically deformed toward the inner circumference of the electrode assembly 14, and the flat portion 31 is welded to the positive electrode current-collecting terminal plate 28. Likewise, the tip of the exposed portion 30 of the negative electrode current collector 17 is a flat portion 32 plastically deformed toward the inner circumference of the electrode 14, and the flat portion 32 is welded to the negative electrode current-collecting terminal plate 22. As such, the lithium ion battery 10 shown in FIG. 3 has a structure in which current is collected directly from the positive electrode current collector 2 and the negative electrode current collector 17 in the electrode assembly 14, that is, the battery has a tabless current collecting structure.

The negative electrode active material layer 18 in the negative electrode 12 is formed, for example, by: applying to the negative electrode current collector 17, a negative electrode material mixture in slurry or paste form obtained by having a negative electrode active material and a binder dispersed in a dispersion medium; and then drying the resultant. The negative electrode active material layer 18 thus formed is usually rolled by being pressed a number of times with rollers or the like.

Examples of the negative electrode current collector 17 include, but are not particularly limited to, current collectors used for a negative electrode in a lithium ion battery. Specifically, a material such as stainless steel, nickel, or copper can be used in the form such as of a foil, membrane, film, or sheet. The thickness of the negative electrode current collector 17 can be set as appropriate within the range of 1 to 500 μm, in accordance with factors such as capacity and size of the lithium ion battery.

Examples of the negative electrode active material include, but are not particularly limited to, negative electrode active materials capable of absorbing and releasing lithium, used in a lithium ion battery. Specific examples include: carbon materials such as graphites and amorphous carbons; silicon and oxides thereof; and tin and oxides thereof. These negative electrode active materials may be used singly or in a combination of two or more.

Examples of the binder include those same as the ones given for the binder for forming the positive electrode active material layer.

The negative electrode material mixture may further contain an additive such as a conductive agent. Examples of the conductive agent include those same as the ones given for the conductive agent for forming the positive electrode active material layer.

The proportion of the negative electrode active material content is preferably 93 to 99 mass % relative to the total mass of the negative electrode active material layer. The proportion of the binder content is preferably 1 to 10 mass % relative to the total mass of the negative electrode active material layer. The proportion of the conductive agent content is preferably 20 mass % or less and more preferably 1 to 20 mass %, relative to the total mass of the negative electrode active material layer.

The separator 13 is interposed between the positive electrode 1 and the negative electrode 12, thereby separating the electrodes. Examples of the separator 13 include a microporous thin film, fabric, and non-woven fabric having insulating properties, being sufficient in mechanical strength and high in ion permeability. The separator material is preferably a polyolefin such as polypropylene or polyethylene, in terms of being excellent in durability and capable of shutdown function at times of overheating. The separator thickness is generally 5 to 300 μm, among which 10 to 30 μm is particularly preferable. Further, the separator may be a monolayer film made of one material, or a composite film or multilayer film made of two or more materials. The porosity of the separator is preferably 30 to 70%, and more preferably 35 to 60%. Here, porosity means the proportion of the volume of the pores relative to the volume of the entire separator.

The non-aqueous electrolyte comprises a non-aqueous solvent and a lithium salt dissolved therein.

Examples of the non-aqueous solvent include, but are not particularly limited to, various non-aqueous solvents used for a non-aqueous electrolyte in a lithium ion battery. Specific examples include: cyclic carbonic acid esters such as ethylene carbonate, propylene carbonate, and butylene carbonate; chain carbonic acid esters such as DMC, EMC, and diethyl carbonate; cyclic ethers such as tetrahydrofuran, 1,4-dioxane, and 1,3-dioxolan; chain ethers such as 1,2-dimethoxyethane and 1,2-diethoxyethane; cyclic esters such as γ-butyrolactone; and chain esters such as methyl acetate. These can be used singly or in a combination of two or more.

Examples of the lithium salt include various lithium salts used as a solute for a non-aqueous electrolyte in a lithium ion battery. Specific examples include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. These can be used singly or in a combination of two or more. The lithium salt concentration is preferably 0.5 to 2 mol/L.

The non-aqueous electrolyte preferably further contains a cyclic carbonic acid ester having at least one unsaturated carbon-carbon bond. Such a cyclic carbonic acid ester dissolves on the negative electrode, thereby forming a film with high lithium-ion conductivity. This film contributes to improving charge/discharge efficiency. Examples of the cyclic carbonic acid ester having at least one unsaturated carbon-carbon bond, include vinylene carbonate, 3-methyl vinylene carbonate, vinyl ethylene carbonate, and divinyl ethylene carbonate. In the above cyclic carbonic acid ester, a part of the hydrogen atoms may be replaced with fluorine atoms. The amount of the above cyclic carbonic acid ester dissolved relative to the non-aqueous solvent, is preferably 0.5 to 2 mol/L.

The non-aqueous electrolyte may further contain a benzene derivative capable of forming a film on the electrode, by decomposing at times of overcharge. Such a benzene derivative inactivates the battery at times of overcharge. A specific example is a benzene derivative having a phenyl group, and a cyclic compound group which is adjacent to the phenyl group. Further specific examples include cyclohexyl benzene, biphenyl, and diphenyl ether. The benzene derivative content is preferably 10 vol % or less of the entire non-aqueous solvent.

Moreover, the non-aqueous electrolyte may be in gelled or solid form. The non-aqueous electrolyte in gelled form contains the non-aqueous solvent, the lithium salt, and a polymer material which retains the non-aqueous solvent and the lithium salt. Examples of the polymer material include polyvinylidene fluoride, polyacrylonitrile, polyethylene oxide, polyvinyl chloride, polyacrylate, and a vinylidene fluoride-hexafluoropropylene copolymer. Examples of the non-aqueous electrolyte in solid form include, but are not particularly limited to, solid polymer electrolytes used for a lithium ion battery.

EXAMPLES

Hereinafter, the present invention will be described more specifically with reference to Examples. Note that the present invention is not limited to the Examples.

Example 1

(1) Production of Positive Electrode Active Material

Lithium carbonate ($Li_2CO_3$) and a co-precipitated hydroxide represented by $Ni_{0.75}Co_{0.2}Al_{0.05}(OH)_2$ were mixed so that the ratio of the number of moles of Li in the lithium carbonate:the total number of moles of Ni, Co, and Al (Ni+Co+Al) in the above coprecipitated hydroxide, became 1:1. The mixture thus obtained was baked under an oxygen atmosphere at 700° C. for 20 hours. After the baking, the baked product was crushed and sieved, thereby obtaining a lithium-containing nickel oxide having an average particle size of 10 μm. The composition of the lithium-containing nickel oxide (positive electrode active material A) thus obtained was $LiNi_{0.75}Co_{0.2}Al_{0.05}O_2$ and the lithium content x was 1.00.

Meanwhile, $Li_2CO_3$ and $Ni_{0.75}Co_{0.2}Al_{0.05}(OH)_2$ were mixed so that the ratio of the number of moles of Li:the total number of moles of Ni, Co, and Al, became 1.05:1. The mixture thus obtained was baked under an oxygen atmosphere at 700° C. for 20 hours. After the baking, the baked product was crushed and sieved, thereby obtaining a lithium-containing nickel oxide having an average particle size of 10 μm. The composition of the lithium-containing nickel oxide (positive electrode active material B) thus obtained was $Li_{1.05}Ni_{0.75}Co_{0.2}Al_{0.05}O_2$ and the lithium content x was 1.05.

(2) Fabrication of Positive Electrode

Ninety parts by mass of the positive electrode active material A and a N-methyl-2-pyrollidone (NMP) solution containing 5 parts by mass of polyvinylidene fluoride (PVDF) were mixed, thereby obtaining a positive electrode material mixture slurry A. Meanwhile, 90 parts by mass of the positive electrode active material B and a NMP solution containing 5 parts by mass of PVDF were mixed, thereby obtaining a positive electrode material mixture slurry B.

The positive electrode material mixture slurry A was applied to both surfaces of aluminum foil having a thickness of 20 μm serving as a positive electrode current collector, followed by drying, thereby forming an inner layer. Next, the positive electrode material mixture slurry B was applied to the surface of the inner layer, followed by drying, thereby forming an outer layer. The ratio of the inner layer thickness: the outer layer thickness was adjusted to 4:1. A stacked body thus obtained was pressed and rolled with a pair of rollers, thereby obtaining a positive electrode having a total thickness of 120 μm. After the rolling, the inner layer thickness was 40 μm and the outer layer thickness was 10 μm. Note that one side of the positive electrode current collector along the longitudinal direction thereof was provided with an exposed portion, being about a few mm from the end edge of the positive electrode current collector and not having the inner and outer layers formed thereon.

A very small amount of lithium carbonate is presumably produced on the inner and outer layers of the positive electrode, obtained as above, by lithium reacting with moisture and carbon dioxide in air. Therefore, the inner and outer layers of the obtained positive electrode were observed by XPS, and presence of lithium carbonate was detected. Moreover, as a result of measuring by XPS the respective lithium carbonate concentrations in the inner and outer layers, the percentage of the lithium carbonate concentration in the inner layer relative to that in the outer layer, was 5%.

(3) Fabrication of Negative Electrode

Ninety-five parts by mass of artificial graphite powder and a NMP solution containing 5 parts by mass of PVDF were mixed, thereby obtaining a negative electrode material mixture slurry. The negative electrode material mixture slurry was applied to both surfaces of copper foil having a thickness of 10 μm serving as a negative electrode current collector, followed by drying, thereby forming a negative electrode active material layer. A stacked body comprising the negative electrode current collector with both surfaces provided with the negative electrode active material layer, thus obtained, was pressed and rolled with a pair of rollers, thereby obtaining a negative electrode having a total thickness of 200 μm. Note that one side of the negative electrode current collector along the longitudinal direction thereof was provided with an exposed portion, being about a few mm from the end edge of the negative electrode current collector and not having the negative electrode active material layer formed thereon.

(4) Preparation of Non-Aqueous Electrolyte

Ethylene carbonate and ethyl methyl carbonate were mixed at a volume ratio of 1:3. In a non-aqueous solvent thus obtained, vinylene carbonate and $LiPF_6$ were dissolved, thereby preparing a non-aqueous electrolyte. The proportion of the vinylene carbonate content was adjusted to 1 mass % relative to the total mass of the non-aqueous solvent. The $LiPF_6$ concentration in the non-aqueous electrolyte was adjusted to 1.0 mol/L.

(5) Fabrication of Cylindrical Battery

The above positive electrode and the above negative electrode were spirally wound with a microporous separator (composite film of polyethylene and polypropylene; product number "2300" available from Celgard, LLC; thickness of 25 μm), thereby obtaining an electrode assembly. The exposed portion of the positive electrode current collector and that of the negative electrode current collector were adjusted so that they are disposed on opposite sides of the electrode assembly in the winding axis direction, when the positive electrode and the negative electrode are made to overlap with each other. With respect to the exposed portion of the positive electrode current collector and that of the negative electrode current collector, their tip portions were bent toward the winding axis, thereby forming flat portions. A positive electrode current-collecting terminal plate (thickness: 0.3 mm) made of aluminum was welded to the flat portion of the exposed portion of the positive electrode current collector, and a negative electrode current-collecting terminal plate (thickness: 0.3 mm) made of nickel was welded to the flat portion of the exposed portion of the negative electrode current collector. The electrode assembly thus obtained was inserted into a bottomed and cylindrical battery case 18 mm in diameter and 65 mm in height. Next, 5.2 mL of the non-aqueous electrolyte was injected into the battery case. In this manner, a lithium ion battery having a design capacity of 2,200 mAh was obtained.

(6) Evaluation of Physical Properties of Lithium Ion Battery

The lithium ion battery obtained as above was kept at room temperature for about 24 hours, thereby stabilizing the open-circuit voltage thereof. Thereafter, the initial discharge capacity, input/output characteristics, and high-temperature storage characteristics of the battery were evaluated in the following manner. The results are shown in Table 1.

The initial discharge capacity was measured by the following steps. First, the battery was charged under an atmosphere at 20° C., at a charge current of 0.2 C until reaching 4.2 V. Next, the battery was discharged at a discharge current of 1 C until reaching 3 V. The discharge current at this time was measured and designated as the initial discharge capacity.

The input/output characteristics were measured by the following steps. First, the battery was charged under an atmosphere at 20° C., at a charge current of 0.2 C until reaching a State of Charge (SOC) of 50%. Thereafter, the battery was kept at room temperature for about 30 minutes, thereby stabilizing the open-circuit voltage thereof. Thereafter, the battery was charged and discharged, respectively for 10 seconds at a current of 1 C. The difference between a charge/discharge starting voltage V2 (V) and an open-circuit voltage V1 (V) at a 50% SOC was divided by the value of the current applied (1 C=2,200 mA), thereby obtaining a rate of change dV/dA of the voltage relative to the current.

The high-temperature storage characteristics were measured by the following steps. First, the battery was charged under an atmosphere at 20° C., at a charge current of 0.2 C until reaching a SOC of 100%. Thereafter, the battery was kept in a constant temperature chamber at 60° C. for 336 hours. After taking out the battery from the constant temperature chamber and sufficiently cooling it down to room temperature, gas chromatography was used to analyze the amount of gas generated inside the battery and the amount of carbon dioxide gas included in the gas.

Example 2

A lithium-containing nickel oxide having an average particle size of 10 μm was obtained in the same manner as Example 1, except for mixing $Li_2CO_3$ and $Ni_{0.75}Co_{0.2}Al_{0.05}(OH)_2$ so that the ratio of the number of moles of Li:the total number of moles of Ni, Co, and Al, became 1.030:1. The composition of the lithium-containing nickel oxide thus obtained was $Li_{1.030}Ni_{0.75}Co_{0.2}Al_{0.05}O_2$ and the lithium content x was 1.030. A battery was fabricated in the same manner as Example 1, except for forming the outer layer in the positive electrode by using this lithium-containing nickel oxide in place of the positive electrode active material B.

Example 3

A lithium-containing nickel oxide having an average particle size of 10 μm was obtained in the same manner as Example 1, except for mixing $Li_2CO_3$ and $Ni_{0.75}Co_{0.2}Al_{0.05}(OH)_2$ so that the ratio of the number of moles of Li:the total number of moles of Ni, Co, and Al, became 1.031:1. The composition of the lithium-containing nickel oxide thus obtained was $Li_{1.031}Ni_{0.75}Co_{0.2}Al_{0.05}O_2$ and the lithium content x was 1.031. A battery was fabricated in the same manner as Example 1, except for forming the outer layer in the positive electrode by using the above lithium-containing nickel oxide in place of the positive electrode active material B.

Example 4

A lithium-containing nickel oxide having an average particle size of 10 μm was obtained in the same manner as Example 1, except for mixing $Li_2CO_3$ and $Ni_{0.75}Co_{0.2}Al_{0.05}(OH)_2$ so that the ratio of the number of moles of Li:the total number of moles of Ni, Co, and Al, became 1.032:1. The composition of the lithium-containing nickel oxide thus obtained was $Li_{1.032}Ni_{0.75}Co_{0.2}Al_{0.05}O_2$ and the lithium content x was 1.032. A battery was fabricated in the same manner as Example 1, except for forming the outer layer in the positive electrode by using this lithium-containing nickel oxide in place of the positive electrode active material B.

Example 5

A lithium-containing nickel oxide having an average particle size of 10 μm was obtained in the same manner as Example 1, except for mixing $Li_2CO_3$ and $Ni_{0.75}Co_{0.2}Al_{0.05}(OH)_2$ so that the ratio of the number of moles of Li:the total number of moles of Ni, Co, and Al, became 1.034:1. The composition of the lithium-containing nickel oxide thus obtained was $Li_{1.034}Ni_{0.75}Co_{0.2}Al_{0.05}O_2$ and the lithium content x was 1.034. A battery was fabricated in the same manner as Example 1, except for forming the outer layer in the positive electrode by using this lithium-containing nickel oxide in place of the positive electrode active material B.

Example 6

A lithium-containing nickel oxide having an average particle size of 10 μm was obtained in the same manner as Example 1, except for mixing $Li_2CO_3$ and $Ni_{0.75}Co_{0.2}Al_{0.05}(OH)_2$ so that the ratio of the number of moles of Li:the total number of moles of Ni, Co, and Al became, 1.080:1. The composition of the lithium-containing nickel oxide thus obtained was $Li_{1.080}Ni_{0.75}Co_{0.2}Al_{0.05}O_2$ and the lithium content x was 1.080. A battery was fabricated in the same manner as Example 1, except for forming the outer layer in the positive electrode by using this lithium-containing nickel oxide in place of the positive electrode active material B.

Example 7

A lithium-containing nickel oxide having an average particle size of 10 μm was obtained in the same manner as Example 1, except for mixing $Li_2CO_3$ and $Ni_{0.75}Co_{0.2}Al_{0.05}(OH)_2$ so that the ratio of the number of moles of Li:the total number of moles of Ni, Co, and Al, became 1.140:1. The composition of the lithium-containing nickel oxide thus obtained was $Li_{1.140}Ni_{0.75}Co_{0.2}Al_{0.05}O_2$ and the lithium content x was 1.140. A battery was fabricated in the same manner as Example 1, except for forming the outer layer in the positive electrode by using this lithium-containing nickel oxide in place of the positive electrode active material B.

Example 8

A battery was fabricated in the same manner as Example 1, except for changing the amounts of the positive electrode material mixture slurries A and B to be applied, so as to adjust the thicknesses of the inner and outer layers after the rolling, to 25 μm, respectively.

Example 9

A battery was fabricated in the same manner as Example 1, except for changing the amounts of the positive electrode material mixture slurries A and B to be applied, so as to adjust the inner layer thickness and the outer layer thickness after the rolling, to 10 μm and 40 μm, respectively.

Example 10

A battery was fabricated in the same manner as Example 1, except for changing the amounts of the positive electrode material mixture slurries A and B to be applied, so as to adjust the inner layer thickness and the outer layer thickness after the rolling, to 47.5 μm and 2.5 μm, respectively.

Example 11

A battery was fabricated in the same manner as Example 1, except for changing the amounts of the positive electrode material mixture slurries A and B to be applied, so as to adjust the inner layer thickness and the outer layer thickness after the rolling, to 49 μm and 1 μm, respectively.

Example 12

The positive electrode material mixture slurry A prepared in Example 1 was applied to both surfaces of aluminum foil having a thickness of 20 μm and serving as a positive electrode current collector, followed by drying, thereby forming positive electrode active material layers each having a thickness of 50 μm. Next, the positive electrode active material thus obtained were exposed for 2 minutes to a moist air flow having a relative humidity of 40% RH and a temperature of 25° C. Except for using a positive electrode thus obtained, a battery was fabricated in the same manner as Example 1.

Comparative Example 1

The positive electrode material mixture slurry A prepared in Example 1 was applied to both surfaces of aluminum foil having a thickness of 20 μm and serving as a positive electrode current collector, followed by drying. The resultant after the drying was pressed and rolled with a pair of rollers, thereby obtaining a positive electrode having a total thickness of 120 μm, being the aluminum foil with both surfaces provided with a positive electrode active material layer having a thickness of 50 μm. Except for using the positive electrode thus obtained, a battery was fabricated in the same manner as Example 1.

Comparative Example 2

The positive electrode material mixture slurry B prepared in Example 1 was applied to both surfaces of aluminum foil having a thickness of 20 μm and serving as a positive electrode current collector, followed by drying. The resultant after the drying was pressed and rolled with a pair of rollers, thereby obtaining a positive electrode having a total thickness of 120 μm, being the aluminum foil with both surfaces provided with a positive electrode active material layer having a thickness of 50 μm. Except for using the positive electrode thus obtained, a battery was fabricated in the same manner as Example 1.

Comparative Example 3

The positive electrode material mixture slurry B prepared in Example 1 was applied to both surfaces of aluminum foil having a thickness of 20 μm and serving as a positive electrode current collector, followed by drying, thereby forming an inner layer. Next, the positive electrode material mixture slurry A prepared in Example 1 was applied to the surface of the inner layer, followed by drying, thereby forming an outer layer. The ratio of the inner layer thickness:the outer layer thickness was adjusted to 4:1. The stacked body thus obtained was pressed and rolled with a pair of rollers, thereby obtaining a positive electrode having a total thickness of 120 μm. After the rolling, the inner layer thickness was 40 μm and the outer layer thickness was 10 μm. In this positive electrode, the inner layer composition and the outer layer composition of the positive electrode active material layer were the reverse of those in Example 1.

Except for using the positive electrode thus obtained, a battery 10 was fabricated in the same manner as Example 1.

Comparative Example 4

The positive electrode material mixture A and the positive electrode material mixture B prepared in Example 1 were mixed at a mass ratio of 8:2. 90 parts by weight of the mixture thus obtained and a NMP solution containing 5 parts by weight of PVDF were mixed, thereby preparing a positive electrode material mixture slurry. Except for using the positive electrode material mixture slurry thus obtained, a battery was fabricated in the same manner as Example 1.

Comparative Example 5

A positive electrode fabricated in the same manner as Example 1 was immersed in water at 25° C. for 15 minutes, thereby washing with water, the surface of the positive electrode. Except for using the positive electrode thus washed, a battery was fabricated in the same manner as Example 1.

With respect to the respective positive electrodes of Examples 2 to 11 and Comparative Example 3, the ratio of the lithium carbonate concentration in the outer layer to that in the inner layer was measured in the same manner as Example 1. With respect to the respective batteries of Examples 2 to 12 and Comparative Examples 1 to 5, the initial discharge capacity, input/output characteristics, and high-temperature storage characteristics were measured in the same manner as Example 1. The measurement results are shown in Table 1.

Note that the rate of change dV/dA indicating the input/output characteristics are shown in values relative to that of Comparative Example 2, being 100. The greater the relative value, the smaller the gradient between current and voltage, which shows that the input/output characteristics are excellent.

In Table 1 below, the "Li content x" indicates the content of Li in the lithium-containing nickel oxide contained in the positive electrode active material layer. In the case where the positive electrode active material layer is a two-layered structure having the "inner layer" and the "outer layer", the "Li content x" indicates the content with respect to the lithium-containing nickel oxide contained in each layer. Further, the "percentage of $LiCO_3$ concentration in the inner layer relative to that in the outer layer" indicates the percentage (%) of the lithium carbonate concentration in the inner layer 4 relative to that in the outer layer 5 measured by XPS, in the case where the positive electrode active material layer 3 is formed as a stacked body comprising the inner layer 4 and the outer layer 5.

TABLE 1

| | Li content x | | Proportion of $Li_2CO_3$ concentration in inner layer relative to that in outer layer | Thickness (μm) | | Initial discharge capacity (mAh) | Input/Output characteristics (index) | High-temperature storage characteristics | |
|---|---|---|---|---|---|---|---|---|---|
| | Inner layer | Outer layer | | Inner layer | Outer layer | | | Amount of gas generated | Amount of $CO_2$ |
| Ex. 1 | 1.00 | 1.05 | 5% | 40 | 10 | 2,215 | 98 | 4.0 | 2.6 |
| Ex. 2 | 1.00 | 1.030 | 90% | 40 | 10 | 2,210 | 90 | 3.1 | 1.7 |
| Ex. 3 | 1.00 | 1.031 | 80% | 40 | 10 | 2,212 | 92 | 3.1 | 1.8 |
| Ex. 4 | 1.00 | 1.032 | 50% | 40 | 10 | 2,215 | 94 | 3.3 | 2.0 |
| Ex. 5 | 1.00 | 1.034 | 20% | 40 | 10 | 2,213 | 96 | 3.5 | 2.2 |
| Ex. 6 | 1.00 | 1.080 | 1% | 40 | 10 | 2,213 | 99 | 6.2 | 4.8 |
| Ex. 7 | 1.00 | 1.140 | 0.5% | 40 | 10 | 2,211 | 98 | 9.0 | 8.1 |
| Ex. 8 | 1.00 | 1.05 | 5% | 25 | 25 | 2,217 | 98 | 5.5 | 4.2 |
| Ex. 9 | 1.00 | 1.05 | 5% | 10 | 40 | 2,212 | 99 | 6.9 | 5.7 |
| Ex. 10 | 1.00 | 1.05 | 5% | 47.5 | 2.5 | 2,214 | 96 | 3.2 | 3.2 |
| Ex. 11 | 1.00 | 1.05 | 5% | 49 | 1 | 2,213 | 90 | 3.1 | 1.6 |
| Ex. 12 | —*1 | | — | 50 | | 2,213 | 98 | 4.0 | 2.6 |
| Comp. Ex. 1 | 1.00 | | — | 50 | | 2,216 | 87 | 3.0 | 1.5 |
| Comp. Ex. 2 | 1.05 | | — | 50 | | 2,214 | 100 | 7.9 | 6.8 |
| Comp. Ex. 3 | 1.05 | 1.00 | 2,000% | 40 | 10 | 2,215 | 88 | 6.9 | 5.7 |
| Comp. Ex. 4 | —*2 | | — | 50 | | 2,215 | 92 | 4.0 | 2.6 |
| Comp. Ex. 5*3 | 1.00 | 1.05 | — | 40 | 10 | 2,212 | 86 | 3.1 | 1.4 |

*1 In the positive electrode active material layer of Example 12, the Li content x in the lithium-containing nickel oxide was made to change continuously from the surface side toward the positive electrode current collector side of the positive electrode active material layer, so that it became gradually smaller.
*2 The positive electrode active material layer of Comparative Example 4 contained the lithium-containing nickel oxide of two kinds, each differing in the lithium content x.
*3 With respect to Comparative Example 5, the positive electrode was washed with water.

As shown in Table 1, with respect to the battery of Example 1, the input/output characteristics were the same as the battery of Comparative Example 2, whereas the amounts of gas generated and of $CO_2$ were able to be made smaller compared to Comparative Example 2. Further, with respect to the battery of Example 1, the amounts of gas generated and of $CO_2$ were the same as Comparative Example 4 (a simple mixed product comprising: the lithium-containing nickel oxide with a large amount of the lithium carbonate; and the lithium-containing nickel oxide with a small amount of the lithium carbonate), whereas the input/output characteristics were able to be more improved compared to Comparative Example 4. This is presumably because the lithium carbonate contained in the lithium-containing nickel oxide improves the input/output characteristics, while the gas generated during high-temperature storage is due to decomposition of the lithium carbonate.

Moreover, with respect to the battery of Example 1, the input/output characteristics improved more, and the amounts of gas generated and of $CO_2$ became smaller, compared to the battery of Comparative Example 3. This is presumably because the battery of Example 1 was disposed with an active material layer having excellent input/output characteristics as the upper layer, thereby enabling a large amount of potential energy from the amount of potential difference caused between the electrodes during charge and discharge, to be provided to the positive electrode active material which had the excellent input/output characteristics. Furthermore, with respect to the battery of Example 1, the amounts of gas generated and of $CO_2$ became smaller, since the amount of the lithium carbonate contained in the entire positive electrode active material layer was presumably smaller compared to the battery of Comparative Examples 3.

With respect to the battery of Comparative Example 5 of which the positive electrode was washed with water, the amounts of gas generated and of $CO_2$ were suppressed, but the input/output characteristics deteriorated more remarkably, compared to Example 1.

Moreover, from the respective batteries of Examples 1 to 7, it is evident that, as the lithium carbonate concentration on the positive electrode current collector side (inner layer side) of the positive electrode active material layer decreased relative to that on the surface side (outer layer side) thereof, the input/output characteristics improved slightly, whereas the amount of gas generated increased remarkably. This is presumably because the positive electrode active material on the positive electrode surface contributed remarkably to the input/output characteristics of the entire positive electrode, and the total amount of the lithium carbonate contained in the positive electrode active material layer contributed remarkably to the amount of gas generated. Therefore, it is apparent that to achieve input/output characteristics as well as durability and reliability of the battery, the lithium carbonate concentration on the positive electrode current collector side of the positive electrode active material layer is preferably 1 to 80% relative to that on the surface side thereof.

Moreover, with respect to the respective batteries of Examples 1 and 8 to 11, the input/output characteristics were all the same with the exception of Example 11, but the amounts of gas generated and of $CO_2$ were all different. This is presumably because the positive electrode active material on the positive electrode active material layer surface contributed remarkably to the input/output characteristics of the entire positive electrode. With respect to the battery of Example 11, it is presumed that since the outer layer containing the positive electrode active material with excellent input/output characteristics was too thin, this positive electrode active material with excellent input/output characteristics was covered with a film originating from matters such as decomposed matter of the non-aqueous electrolyte formed the positive electrode active material layer surface during charge and discharge. Therefore, to achieve input/output characteristics as well as durability and reliability of the battery, the thickness of the outer layer is preferably 5 to 50% relative to the thickness of the entire positive electrode active material.

[Industrial Applicability]

The positive electrode for a lithium ion battery and the lithium ion battery of the present invention are excellent in input/output characteristics, durability, and reliability. Therefore, the lithium ion battery is suitable as the respective power sources for electric vehicles, hybrid cars, electric power-assisted bicycles, power tools, backup, load leveling, etc.

The invention claimed is:

1. A positive electrode for a lithium ion battery, comprising a positive electrode current collector, and a positive electrode active material layer formed on a surface of the positive electrode current collector,
   wherein the positive electrode active material layer comprises: a lithium-containing nickel oxide represented by the general formula (1): $Li_xNi_{1-(p+q+r)}Co_pAl_qM_rO_{2+y}$, where M is one element selected from the group consisting of transition elements (excluding Ni and Co), Mg, Ca, Zn, and Bi, $0.8 \leq x \leq 1.4$, $-0.1 \leq y \leq 0.1$, and $0 < (p+q+r) \leq 0.7$; and lithium carbonate,
   the positive electrode active material layer comprises a high concentration region where the lithium carbonate concentration is high, and a low concentration region where the lithium carbonate concentration is low, and
   the high concentration region covers a range of 2 to 80% of the total thickness of the positive electrode active material layer, the range starting from a surface thereof, and the low concentration region covers the range remaining on the positive electrode current collector side of the positive electrode active material layer.

2. The positive electrode for a lithium ion battery in accordance with claim 1, wherein the ratio of the lithium carbonate concentration in the low concentration region to the lithium carbonate concentration in the high concentration region, is 0.5 to 90%.

3. A fabrication method of a positive electrode for a lithium ion battery, the method comprising the steps of:
   applying to a surface of a positive electrode current collector, a positive electrode material mixture for inner layer formation, the mixture comprising: a lithium-containing nickel oxide represented by the general formula (1): $Li_xNi_{1-(p+q+r)}Co_pAl_qM_rO_{2+y}$, where M is one element selected from the group consisting of transition elements (excluding Ni and Co), Mg, Ca, Zn, and Bi, $0.8 \leq x \leq 1.4$, $-0.1 \leq y \leq 0.1$, and $0 < (p+q+r) \leq 0.7$; and lithium carbonate, thereby forming an inner layer, and
   applying to a surface of the inner layer, a positive electrode material mixture for outer layer formation, the mixture comprising: a lithium-containing nickel oxide represented by the general formula (1); and lithium carbonate, thereby forming an outer layer,
   wherein a lithium content $x_2$ in the lithium-containing nickel oxide in the positive electrode material mixture for outer layer formation, is greater than a lithium content $x_1$ in the lithium-containing nickel oxide in the positive electrode material mixture for inner layer formation.

4. The fabrication method of a positive electrode in accordance with claim 3, wherein the $x_1$ is 0.8 to 1.1 and the $x_2$ is 1.0 to 1.4.

5. A lithium ion battery comprising the positive electrode in accordance with claim 1, a negative electrode, a separator separating the positive electrode and the negative electrode, and a non-aqueous electrolyte.

6. A fabrication method of a positive electrode for a lithium ion battery, the method comprising the steps of:
   applying to a surface of a positive electrode current collector, a positive electrode material mixture comprising: a lithium-containing nickel oxide represented by the general formula (1): $Li_xNi_{1-(p+q+r)}Co_pAl_qM_rO_{2+y}$, where M is one element selected from the group consisting of transition elements (excluding Ni and Co), Mg, Ca, Zn, and Bi, $0.8 \leq x \leq 1.4$, $-0.1 \leq y \leq 0.1$, and $0 < (p+q+r) \leq 0.7$; and lithium carbonate, thereby forming a positive electrode active material layer, and
   exposing the positive electrode active material layer to a gas flow containing at least one of moist air and carbon dioxide gas so as to form a high concentration region where the lithium carbonate concentration is high on the surface side of the positive electrode active material layer, and a low concentration region where the lithium carbonate concentration is low on the positive electrode current collector side of the positive electrode active material layer.

* * * * *